United States Patent [19]

Belletti

[11] 4,367,088
[45] Jan. 4, 1983

[54] SYSTEM FOR FABRICATING PREFORMS IN MACHINES FOR GLASS CONTAINER PRODUCTION

[75] Inventor: Alide B. Belletti, Monterrey, Mexico

[73] Assignee: Investigacion Fic Fideicomiso, Monterrey, Mexico

[21] Appl. No.: 263,001

[22] Filed: May 12, 1981

[51] Int. Cl.³ .................. C03B 9/24; C03B 9/197
[52] U.S. Cl. .................................. 65/234; 65/235; 65/261; 65/360
[58] Field of Search ............. 65/234, 235, 261, 233, 65/360

[56] References Cited

U.S. PATENT DOCUMENTS 1,878,863 9/1932 La France ............................. 65/234
3,171,729 3/1965 Andersen ........................ 65/233 X
3,776,711 12/1973 Hollingsworth ..................... 65/261

Primary Examiner—Arthur D. Kellogg
Attorney, Agent, or Firm—Charles Richard Werner; William H. Maxwell

[57] ABSTRACT

Improved system for the fabrication of preforms used in the production of glass containers in I.S. machines, employing the blow-blow process to reduce the time delay of mechanical movement between the stages of crown formation and commencement of counterblowing, and the increase in counterblowing or molten glass gob inflation, thus improving glass distribution in the walls of the preform as well as in the finished container, resulting in an improved quality container and in increased production.

2 Claims, 6 Drawing Figures

SYSTEM FOR FABRICATING PREFORMS IN MACHINES FOR GLASS CONTAINER PRODUCTION

BACKGROUND OF THE INVENTION

The improved system of the present invention fundamentally comprises: a parison mold of the type which is divided or separated in two halves and which is suitably supported on its respective opening and closing mechanism, wherein the preform or parison is formed by the blowing of a gob of molten glass; an inversion arm to carry the preform from an inverted to a normal or upstanding position and vice versa to an inverted position; a crown mold mounted on the inversion arm, said crown mold being of the type which is divided or split in two halves and having a counterblowing nozzle and a retractable plunger or piston centrally disposed therein which is engagingly coupled to the lower half of the parison mold when both of its halves are closed to form the crown, thereby reducing the time for mechanical movement through the combination of a funnel, centrally and coincidentally integrated to the upper part of the parison mold, to receive, guide and/or pre-form a gob of molten glass to the inside of the parison mold; a compression head that engages and disengages, by means of its inlet and outlet devices, respectively, with the integral funnel, to provide a seating blowing action which seats the gob at the bottom of the parison mold, to ensure the filling of the crown mold for the proper crown formation and guarantees the uniform contact of glass with the parison mold walls; a closure or baffle that has its lower, internal part shaped to conform with the bottom of the preform and which is engaged and disengaged, alternately with the compression head and through its respective inlet and outlet devices, with the integrated funnel and which has as its sole purpose the closing of the upper part of the parison mold, to enable the counterblowing by the crown mold, to inflate the gob and form the preform by means of which mechanical movement time is reduced by reducing each stage of the operation, thus permitting better quality and/or greater production of glassware.

I. Field of the Invention

In the conventional system for glass container production by the so-called "blow-blow" process in I.S. machines with Individual Sections for blowing glass articles, it is necessary to form a preform or parison in an inverted position, in which the container crown is also formed, and then the preform is inverted to its normal position and is deposited in the finishing mold, in which it is blown by filling the finish mold, thus shaping the container to the desired final shape.

Preform formation for glass container production is conventionally carried out by means of the blow-blow process and in the I.S. machines by first coupling a funnel over the parison mold, to receive, guide and/or pre-form the molten-glass gob which is usually cylindrical in shape and supply it centrally to the parison mold; thereafter there is coupled over the funnel, a closure that provides a settle blowing that settles or seats the gob in the bottom of the parison mold, in order to fill the crown mold, correctly shape the container crown and allow for uniform contact of glass with the parison mold walls. After performing the seating blowing, the enclosure is disengaged and withdrawn and the funnel is disengaged and withdrawn. Finally, the closure is again engaged, this time over the parison mold, to act in this instance, as a closure that has the shape of the preform bottom, to perform the counterblowing and shape said preform.

In a timed sequence, the conventional system for forming the preform includes: one crown forming time during which the funnel is engaged over the parison mold, one gob of molten glass is loaded into the parison mold and the closure is engaged over the funnel to provide the settle blowing that ensures filling of crown mold and the formation of the crown in the preform; then, there is a movement time period during which the glass gob remains inside the parison mold while the closure is being engaged and disengaged, the funnel is engaged and disengaged and the closure is again engaged, this time over the parison mold to act solely as a closure; finally, there is a counterblowing time wherein the preform is inflated and shaped inside the parison mold, leaving said preform ready for inversion and final blowing in the finish mold. In glass container production with conventional I.S. machines and with the blow-blow process, there normally results a limited number of finished containers containing a flaw known in the art as settle wave. The settle wave is a thinned glass ring that extends around the blown container in the area between the container bottom and approximately three-fourths of its height and is due to a non-uniform glass distribution on the container walls. The settle wave and non-uniform container walls produce a reduction in the container strength, and thus, these containers leave much to be desired as to quality. It has been found that product quality can be considerably improved when the counterblowing time is increased, since this allows for good blowing or inflation of the preform and, consequently, a good glass distribution on container walls. Now, since both the crown formation time and the total preform formation time are considered as constant for a given type of container, the counterblowing time could be extended only at the expense of mechanical movement time. However, in conventional I.S. machines it is practically impossible to reduce the time for mechanical movement since it is absolutely necessary to disengage and remove the closure from the funnel, disengage and remove the funnel and again engage the closure, this time over the parison mold, which is a time-consuming operation. On the other hand, it is practically impossible to speed up the closure and funnel engagement and disengagement to reduce the time for mechanical movement since there exists a necessary time index therefor, due to friction between the parts. Additionally, the known I.S. machines have the disadvantage that the closure operates twice in the same forming cycle, first to provide a settle blowing and then as a closure, thus resulting in more work that will wear its mechanism at a faster rate.

Due to these problems, in-depth studies have been carried out for the purpose of reducing the time duration for mechanical movement in order to prevent flaws in the containers and reduce the operation of devices to a minimum to prevent excessive wear thereof.

II. Description of the Prior Art

U.S. Pat. No. 3,536,468 claims an apparatus to perform the glass parison forming with a seating blowing closing means that comprises, in a single unit, a funnel to receive and guide the glass gob, coincidently engaged over a seating blowing and lubricant spray device, that allows lubricant spray inside the parison mold or outside the glass gob passing therethrough and the immediate application of the seating blowing without mechanical funnel and closure replacement that provide the seating blowing. The seating blowing and lubricant spray device consists of: one seating blowing valve comprising a valve shell connected with a line that provides for the seating blowing; an internal frame concentrically secured inside the shell and provided with horizontal, diametral openings for the passage of the seating blowing therethrough and a pair of swinging gates that drop by gravity onto the substantially quadrangular hollow in the frame, covering the openings thereof; said gates, upon action of the seating blowing will lift up and cover the entrance of this valve, thus allowing to carry out the seating blowing without the same escaping through the valve and funnel, and a lubrication valve coupled under the seating blowing valve, which consists of a valve shell connected with a lubricant-supply line and an annular nozzle concentrically located inside the valve shell, having the shape of a secondary nozzle to receive, lubricate and correct the path for the gob coming from the quadrangular space in the seating blowing valve frame and said lubrication valve is coupled to the upper part of the parison mold. Thus, with said apparatus the need of engaging and disengaging the funnel in the usual sequence is avoided, since the funnel is already coupled as a unit on the seating blowing device; thus, this device will only be engaged to perform the guidance, lubrication and seating blowing in a single operation and thereafter to withdraw and engage the bottom closure, to carry out the counter blowing, shape the preform and thus, try to reduce the mechanical movement time. Although this apparatus has the advantage that the funnel is coupled with the seating blowing and lubricant spray device as a unit, that is engaged over the parison mold, to then engage the closure and perform the counter blowing in only two operations, it has the considerable inconvenience that the device is too heavy and cumbersome for quick movement, requiring a mechanical movement time, that is perhaps, even greater than that of conventional machines, since the components of the latter are much lighter and expedient to remove.

Likewise, due to the weight and bulk of this apparatus, serious wear problems occur in the machine.

Said apparatus also has the disadvantage that it has reduced operational efficiency, since the closing gates to perform the seating blowing, leave much to be desired in their operation and the equipment sealing. On the other hand, the apparatus is somewhat complicated in its construction, operation and maintenance, making it very costly.

U.S. Pat. No. 3,672,860 claims an apparatus similar to that of U.S. Pat. No. 3,536,468, with the difference that the former includes a lubricant spray nozzle that is shaped in a fashion to adapt to a non-circular section preform, in order to pre-mold the glass gob to produce non-circular section preforms and containers and that also includes all the disadvantages inherent to the apparatus.

U.S. Pat. No. 3,171,128 discloses an apparatus that suggests, without claiming the same, the advantage that the upper part of the parison mold is shaped as a funnel for glass-gob-reception and guidance; however, this apparatus is completely different from that of the present invention since, in lieu of performing a seating blowing through the upper part of the parison mold, to ensure good glass contact with the parison-mold walls, a vacuum is drawn through the crown mold part and, then, only a parison-bottom closure is engaged to perform the counter blowing. Said apparatus has the disadvantage that, by substituting crown vacuum for the seating blowing, uniform glass contact with the parison-mold walls is not ensured and is subject to glass trapping air bubbles between the glass and the parison-mold walls which, upon counter blowing the gob will prevent uniform glass distribution on the preform walls, the settle wave appearing again and, consequently, will bring about the formation of poor-quality containers.

Finally, in the publication *Glass Technology*, Vol. 9, No. 6, of December 1978, there is described the concept of integrating the funnel with the parison mold and conform the closure to them, comprising a machine which is completely different from the I.S. machine, since it operates with the press-blow process.

In other words, heretofore, a reduction in the mechanical movement time in the I.S. machines had not been achieved, since the same operates with the blow-blow process, in a simple and economical manner.

SUMMARY OF THE INVENTION

All those disadvantages are overcome with an improved system for the formation of preforms or parison for the production of glass containers, since a funnel is integrated on the upper part of the parison mold and by providing, as a fully novel concept, a compression head and a closure as independent units, in the present invention, that are fittingly engageable in a sequential and independent manner from the other, over the funnel integrated to the parison mold, which eliminates the need of engaging and disengaging the funnel and the closure in the customary sequence, reducing wear of parts, reducing the time for mechanical movement and increasing the counter-blow time, thus achieving better glass distribution in the blank and the final container and, as a result, better container quality and greater production by reduction of losses due to defective containers.

In addition, with the improved system of the present invention, there is the very great advantage that the reduction in mechanical movement time allows, in addition to improving product quality, increasing the production, since that time reduction could be divided both to improve the product and to increase production.

It is, therefore, an object of the present invention, to provide an improved system for the formation of preforms for the production of glass containers, to reduce the time for mechanical movement and to increase the counter blowing time in order to allow uniform glass distribution in the preform and, as a result, in the final container, resulting in better-quality containers and increased production.

It is another object of the invention to integrate the funnel to the upper part of the parison mold, to avoid the need of engaging and disengaging said funnel and to allow for a reduction in the mechanical movement time due to the elimination of said stage.

It is yet another object of the invention to provide, as a novel concept, a compression head and a closure, as separate units, capable of fittingly engaging, sequentially and independent from each other, in rapid operations, that will allow a reduction in the mechanical movement time and avoid the need of introducing complicated devices, subject to rapid wearing, unreliability and higher cost.

These and other additional advantages will become evident to those skilled in the art from the following detailed description in which the invention is presented in an illustrative, non-limitative manner.

DETAILED DESCRIPTION OF SPECIFIC EMBODIMENTS OF THE INVENTION

Figure 1:
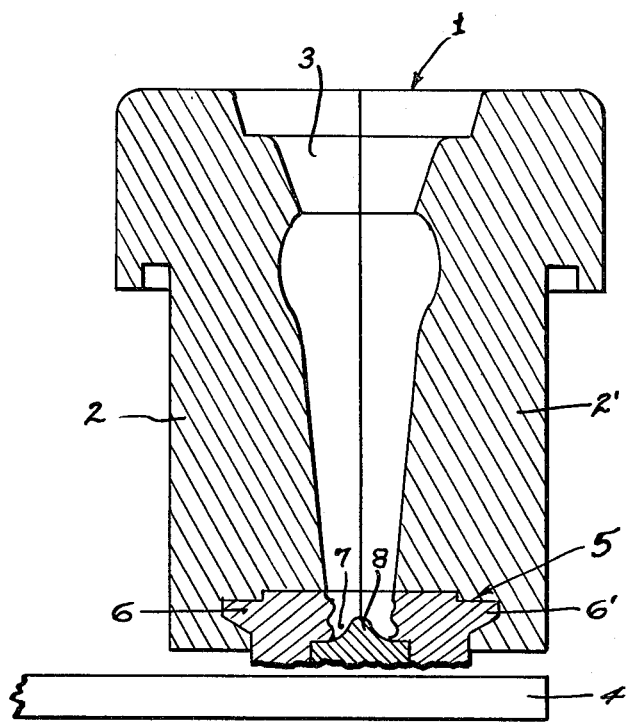
Figure 5:
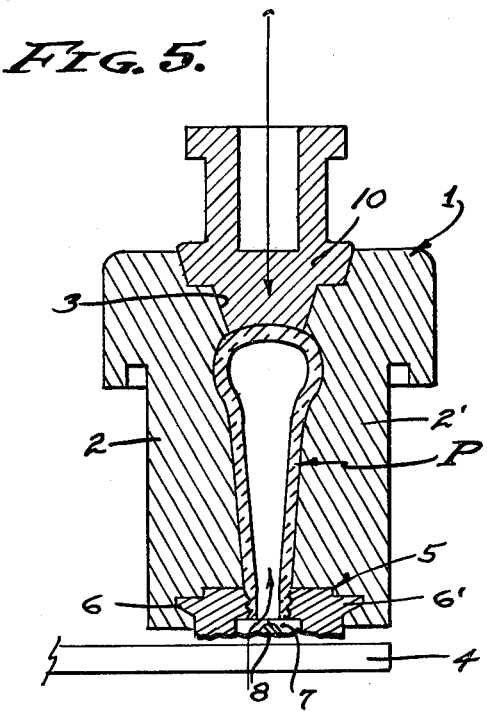
Figure 6:
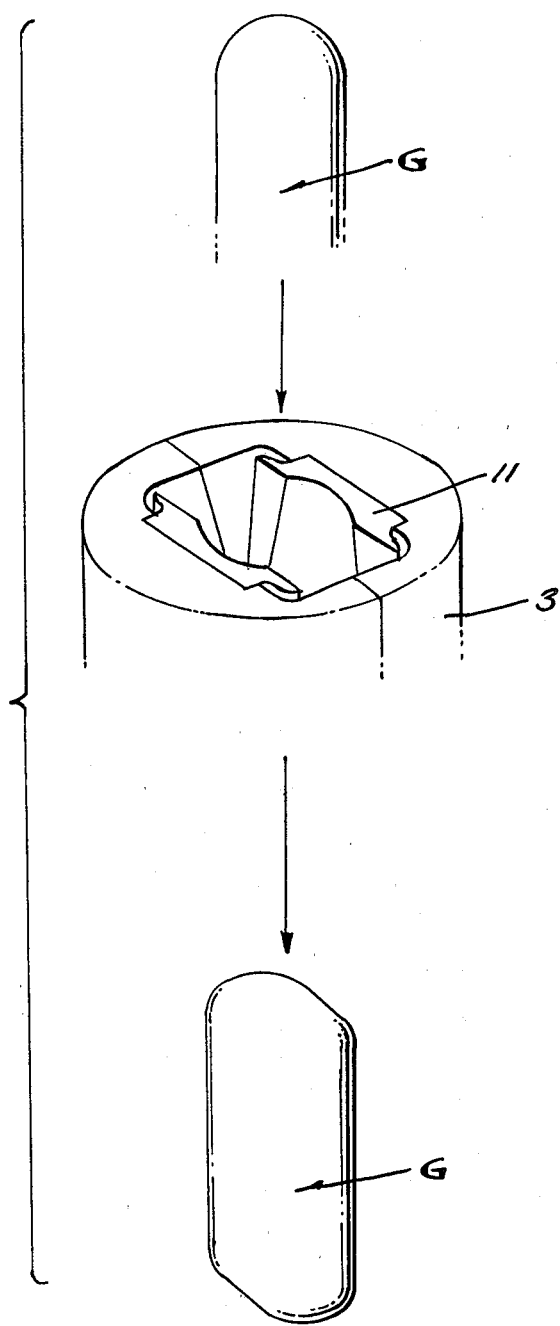

The invention will be described hereinafter with reference to certain specific embodiments of the invention, with reference to the attached drawings illustrative thereof and in which the same characters refer to the same parts in the several views and wherein:

FIG. 1 is a sectional, elevational view of a parison mold that has the funnel integrated in the upper part thereof, in accordance with the improved system for the fabrication of preforms for glass container production, of the present invention;

FIGS. 2, 3, 4, and 5, are sectional, elevational views of a sequence of a preform loading and forming sequence with the improved system of the present invention; and FIG. 6 is a schematic, sectional, perspective and detailed view of an embodiment of the funnel integrated to the parison mold of FIG. 1, of the improved system of the present invention.

With reference to FIGS. 1 through 5, the improved system for preform fabrication for glass container production of the present invention is comprised mainly of; a parison mold 1, of the type divided or split into two halves 2, 2', suitably supported on an open-close device (not shown) of the usual type, and that has integrated on its upper end a funnel 3; an inversion arm 4 carrying on its upper part, a crown mold 5, of the type split in two halves 6, 6', having a counter blowing nozzle 7 and a retractable plunger or piston 8, centrally arranged thereon; on said crown mold 5, the halves 2, 2' of the parison mold 1 close, sequentially capturing it on its bottom part, firstly a compression head 9, and secondly a preform baffle or bottom closure 10, as separate units, independent from each other and mounted on the conventional inlet and outlet devices, (not shown) that have the lower part shaped in a manner to be fittingly engaged with the funnel 3 and the parison mold.

As can be seen in FIG. 6, the funnel 3 may include preform attachments 11, to guide and/or pre-form a glass gob that is being loaded, when it is desired that the containers have a noncircular cross-section.

Figure 2:
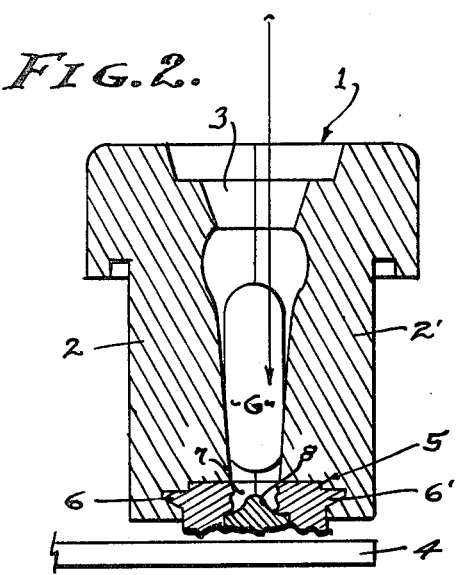
Figure 3:
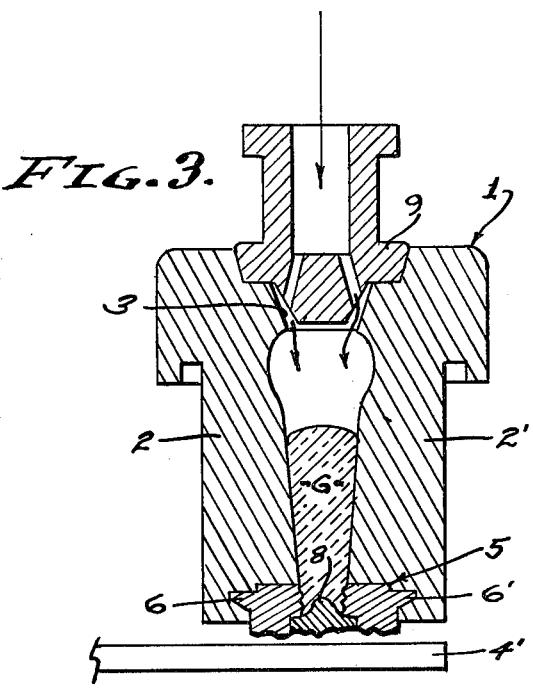
Figure 4:
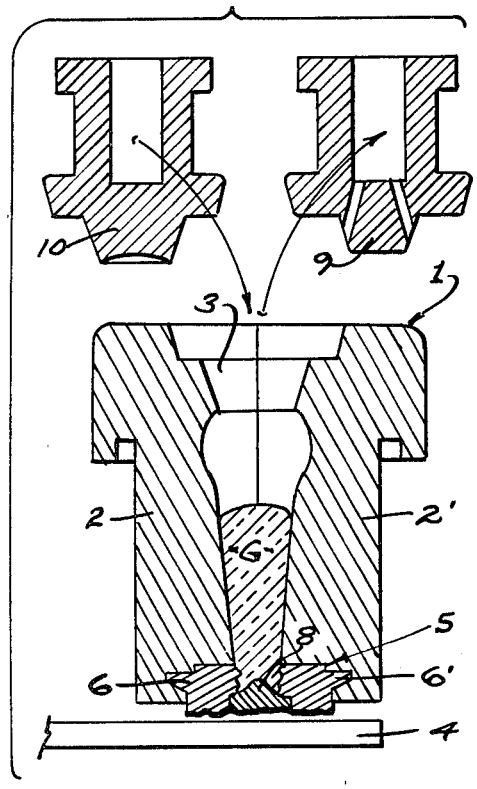

With the improved system of the present invention, shown in sequence in FIGS. 2 to 5, first, a glass gob G is loaded, and is guided and/or pre-formed (FIG. 6) through the funnel into the parison mold 1 (FIG. 2). Thereafter, a compression head 9 is engaged, to provide a seating blowing downwardly, as shown by arrows, to settle the gob G at the bottom of parison mold 1 and to fill corwn mold 5 (FIG. 3). Then compression head 9 is disengaged and moves out, while the preform bottom closure 10 moves in as shown by the arrows (FIG. 4); finally, with the preform bottom closure 10 engaged with the funnel 3 and with the parison mold 1, the upwardly-directed counter blowing is performed, as shown by the arrows, through the counter blowing nozzle 7, upon retraction of plunger 8, to shape or form the preform P which fills the suitably closed parison mold (FIG. 5).

Thereafter, as is well known in the art, the parison mold 1 will open and the preform P, retained by the crown mold 5 will be taken by the inversion arm 4 to a final blowing station where, in a position with the crown disposed upwardly and the bottom disposed downwardly, a finish mold (not shown) will close around the crown mold 5 and the preform P, to perform the final blowing and shaping of the container; finally, the finish mold and the crown mold will open to release the container to be secured by an extractor (not shown) that will deposit it on a cooling plate, where a pusher will convey it to a conveyor belt that will transport it to a tempering device.

After the container is released from the crown mold 5, it will be moved by the inversion arm 4 to the closed position of FIG. 1, where the halves 2, 2' of the parison mold 1 will close and be readied for another charge of glass gob G.

It will be understood that the invention is not to be limited to the aforesaid embodiments and that those skilled in the art, with the teachings of this invention, will be able to make changes in the design and arrangement of the component parts of the invention, that will be clearly comprised within the true spirit and scope of the invention, as claimed in the appended claims.

What is claimed is:

1. Improved blow and blow system for fabricating preforms in machines for glass container production, comprising: a parison mold of the type divided in two halves, said parison mold being suitably supported by respective opening and closing devices, wherein the preform is formed by blowing a gob of molten glass; an inversion arm carrying the preform from an inverted position to a normal position; a crown mold mounted on the inversion arm and of the type that divides and splits in two halves, having a counter blowing nozzle and a retractable plunger centrally disposed therein and securely engaged to the lower part of the parison mold when both its halves are closed, to form the crown; wherein the improvements for reducing the time for mechanical dislogement are characterized by including a funnel coincidently and centrally integrated on the upper part of the parison mold to guide and form the molten glass gob to the inside of the parison mold; a first compression head engaged and disengaged through respective inlet and outlet devices with the integrated funnel and parison mold to provide a seating blowing that ensures uniform glass contact with the internal walls of the parison mold and the filling of the crown mold for suitable forming of the container crown; and a second bottom closure engaged and disengaged through respective inlet and outlet devices with the integrated funnel and parison mold and having its lower internal part shaped to the shape of the preform bottom and that closes the parison mold for a counter blowing to inflate the molten glass gob and shape the preform.

2. Improved system for fabricating preforms in machines for glass container production, as claimed in claim 1, characterized in that the funnel is irregularly shaped to receive and pre-form the glass gob for the production of preforms for containers of irregular cross section.

* * * * *